ies Patent

United States Patent
Parnell

[15] 3,668,672
[45] June 6, 1972

[54] CAPACITIVE TRANSDUCER
[72] Inventor: James A. Parnell, Houston, Tex.
[73] Assignee: Bausch & Lomb Incorporated, Rochester, N.Y.
[22] Filed: Nov. 13, 1970
[21] Appl. No.: 89,514

Related U.S. Application Data
[63] Continuation of Ser. No. 688,500, Dec. 6, 1967, abandoned.

[52] U.S. Cl.................................340/200, 340/211, 317/253, 317/255
[51] Int. Cl..........................................................G08c 19/10
[58] Field of Search....................................................340/200

[56] References Cited

UNITED STATES PATENTS

| | | | |
|---|---|---|---|
| 2,246,928 | 6/1941 | Schick | 317/253 X |
| 2,527,215 | 10/1950 | Hahn | 340/200 |
| 2,911,638 | 11/1959 | Bowman | 340/200 UX |
| 3,256,482 | 6/1966 | Rosso | 324/61 |
| 3,296,522 | 1/1967 | Wolfendale | 340/200 X |
| 3,312,892 | 4/1967 | Parnes | 340/200 X |
| 3,323,046 | 5/1967 | Liu | 324/61 |

Primary Examiner—Thomas B. Habecker
Attorney—Frank C. Parker and Charles C. Krawczyk

[57] ABSTRACT

A variable capacitance displacement transducer is disclosed for developing an electrical signal having an amplitude precisely controlled by the position of a mechanical input element, which in turn varies the capacitance of the transducer. The transducer includes three spaced conductive places arranged in parallel relation. Electrical signals are applied to one of the outer plates. The other two plates are maintained at substantially the same signal level for minimizing the capacitance therebetween so that the center plate functions as a shield to control the capacitive coupling between the two outer plates. An amplifier including a negative feedback circuit is coupled to the other outer plate to develop output signals having amplitudes determined by relative position between the inner plate and the two outer plates.

12 Claims, 14 Drawing Figures

PATENTED JUN 6 1972 3,668,672

JAMES A. PARNELL
INVENTOR.

BY Charles C. Krawczyk

ATTORNEY

JAMES A. PARNELL
INVENTOR.

BY Charles C. Krauczyk

ATTORNEY

JAMES A. PARNELL
INVENTOR.

BY Charles C. Krauzsyk

ATTORNEY

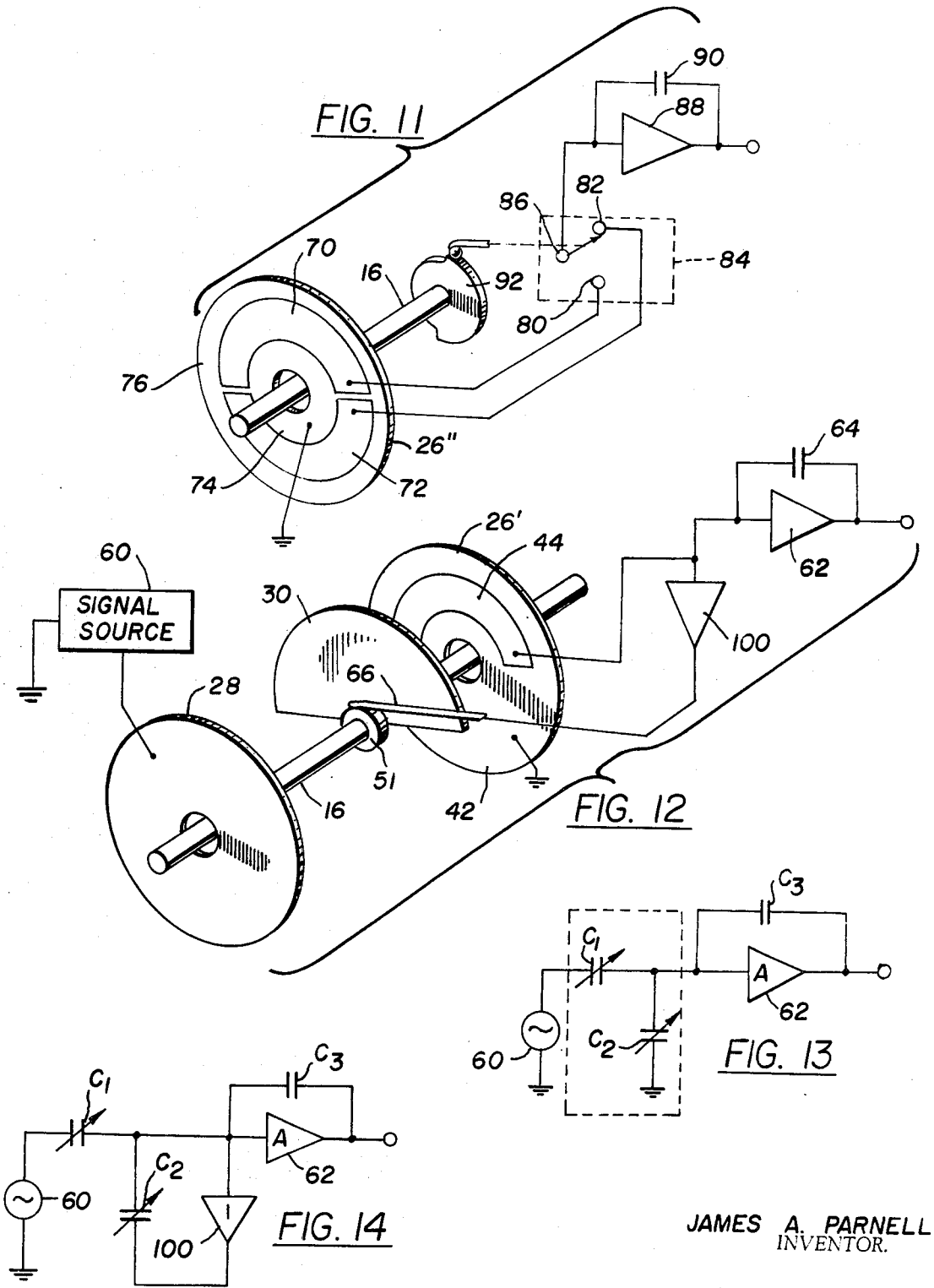

3,668,672

CAPACITIVE TRANSDUCER

This is a continuation application of application Ser. No. 688,500, filed Dec. 6, 1967, now abandoned.

This invention relates to apparatus for converting displacement into electrical signals and more particularly to apparatus for extracting displacement as a capacitance displacement corresponding thereto, to control the magnitude of the electrical signals generated by the apparatus.

In the field of instrumentation and control, quantities to be measured, such as displacement, flow rate, pressure, etc., are generally converted into electrical signals by means of transducers. Generally the measured quantity is converted into, or is, a linear or an angular displacement. The transducers sense the amount of displacement and generate a corresponding electrical signal. The signal can have a linear relation with respect to the displacement, or non-linear, such as in the case of a logarithmic function.

The transducers are frequently installed as feedback elements in servosystems, such as in recorders, to provide an indication of the displacement or position of a mechanical element, such as a recorder pen. In this environment the transducer is subject to long periods of operation, frequently measuring displacement over a small portion of its range, and often in a fluctuating mode, such as in the case of recording or monitoring low amplitude alternating signals. Hence, it is advantageous to use transducers having no critical sliding contacts which can wear and cause scaling variations and noise. In addition, since accuracy is generally of prime importance, the trans-ducers should have infinite resolution, excellent repeatability and stability, and should be capable of accurately generating the desired linear or non-linear input-to-output relationship. Furthermore, the transducer should exhibit low inertial and friction loading. The transducer should also be relatively insensitive to forces transverse to its normal direction of measurement to allow its use in areas of high vibration. In addition to the foregoing requirements, the transducer should be relatively inexpensive.

At the present time slidewire potentiometers are being extensively used as displacement transducers, particularly in servo systems employed in recorders. This is primarily due to their low cost. Unfortunately, the potentiometers are susceptable to mechanical wear. As a result the potentiometers often determine the operational life of the system in which they are employed, particularly if oscillated for extended periods over a small portion of their range. Furthermore, the resolution from low cost potentiometers, such as wire wound potentiometers, is limited to the spacing between wires. The slide wire also often places an undesirable friction load on the moving mechanical input member. Various types of deposited film potentiometers are also available. While these devices do exhibit infinite resolution and somewhat longer mechanical life than the wire wound types, units with excellent linearity are not available except at relatively great expense.

Various non-contacting transducers are currently available, such as the differential transformers, (LVDT), resolvers and capacitive transducers. None of these currently available devices have been found to include the above mentioned combination of requirements. In the case of the differential transformer and the capacitive transducer, the useable mechanical dynamic range, or stroke of the input member is generally limited. Furthermore, except for very expensive units, these devices do not exhibit sufficient linearity. In the case of resolvers and differential transformers, it is extremely difficult, if not impractical, to achieve various non-linear input-to-output relationships. In any case, the presently available devices have been found to be prohibitive in cost if accuracy, repeatability, range, and resolution, among other things, are required in a single device.

It is therefore an object of the invention to provide a new and improved displacement to electrical signal conversion apparatus fulfilling the requirements stated above.

It is also an object of this invention to provide a new and improved capacitive displacement transducer providing precise indication of displacement at relatively low cost.

It is a further object of the inventor to provide a new and improved capacitive displacement transducer that is substantially insensitive to forces applied transversely to the direction of movement, or the axis of rotation, of the transducer.

SUMMARY OF THE INVENTION

The capacitive displacement transducer of the invention includes three conductive plates justapositioned in substantially parallel relation. Input electrical signals are applied to one of the outer conductive plates. The other two conductive plates are maintained at substantially the same signal level to minimize the capacitive effect between the plates and so that the center plate acts as a shield to control the capacitive coupling between the two outer plates. An output circuit is coupled to the other outer plate to develop an electrical signal having an amplitude that is a function of the capacitive coupling between the two outer plates as determined by the position of the inner plate relative to the two outer plates. Preferably the center plate is coupled to move with the displacement to be measured, although the center plate can be held stationary and the outer plates moved instead. Furthermore, the motion can be linear or angular, provided the plates remain in substantially parallel relation.

In a first embodiment of the invention, the center plate and one outer plate are maintained at substantially the same signal level by grounding the center plate and connecting the outer plate to an amplifier including negative feedback for maintaining the outer plate at virtual ground.

In another embodiment of the invention the center plate and the outer plate are interconnected by a unity gain amplifier to maintain the two plates at substantially the same signal level.

A further feature of the invention includes separating the output outer plate into a plurality of separated active areas and including a switching circuit to provide for continuous displacement measurement in the case of an angular motion capacitive transducer.

BRIEF DESCRIPTION OF THE DRAWINGS

FIG. 11 is a modification of the diagram of FIG. 10 including the output plate of FIG. 5 and switching connections therefor.

FIG. 12 is a schematic diagram of the capacitive transducer of the invention including a second embodiment of the electrical connections made thereto.

FIG. 13 is an electrical schematic diagram illustrating an equivalent circuit of the apparatus of FIG. 10.

FIG. 14 is an electrical schematic diagram illustrating an equivalent circuit of the apparatus of FIG. 12.

DESCRIPTION OF THE PREFERRED EMBODIMENTS

Figure 1:
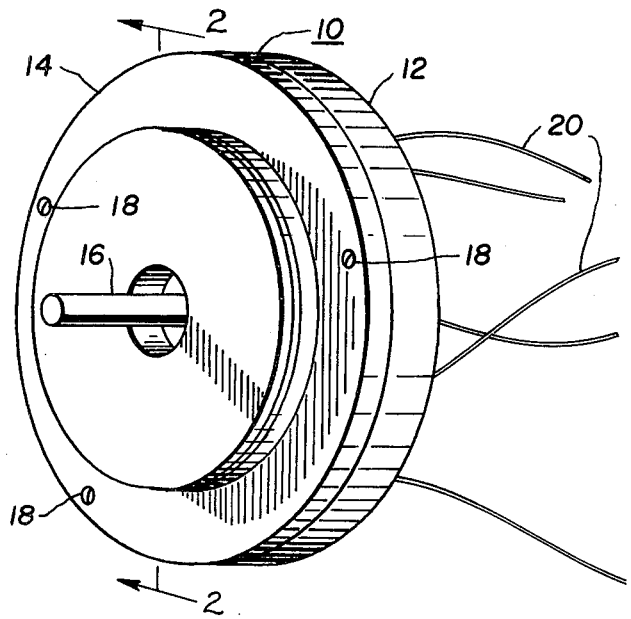
FIG. 1 is a perspective view of a housing for a capacitive transducer including the invention.
Figure 2:
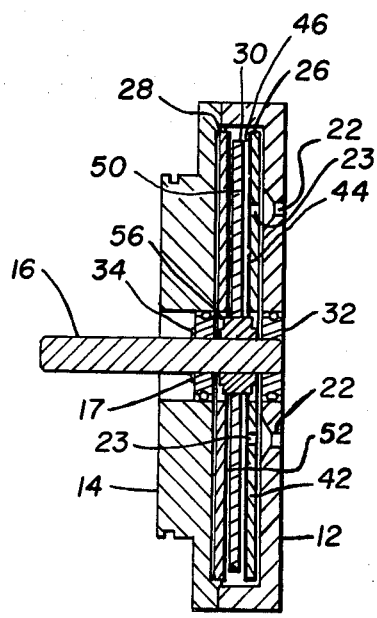
FIG. 2 is a cross-sectional view of the embodiment of FIG. 1 taken along the line 2—2.

The capacitive transducer of the invention is described in the context of two stationary plates and a rotary movable capacitive plate therebetween. However, it must be understood that the apparatus so described can be easily modified in accordance with the teachings of this invention to provide for a linear motion capacitive transducer, including two stationary plates and a movable plate mounted for straight line motion therebetween. The housing for capacitive transducer 10, illustrated in FIG. 1, includes back and front covers 12 and 14, respectively, for mounting the capacitive elements therebetween. A rotatable input shaft 16 extending from the housing is adapted to be coupled to the mechanical input element, the angular displacement of which is to be measured. The front and back covers are fastened together by the screws 18. The shaft 16 is held in position by a "C" clamp 17 (FIG. 2). Electrical connections to the capacitive transducer are made by the wires 20 extending from the back cover 12.

Figure 10:
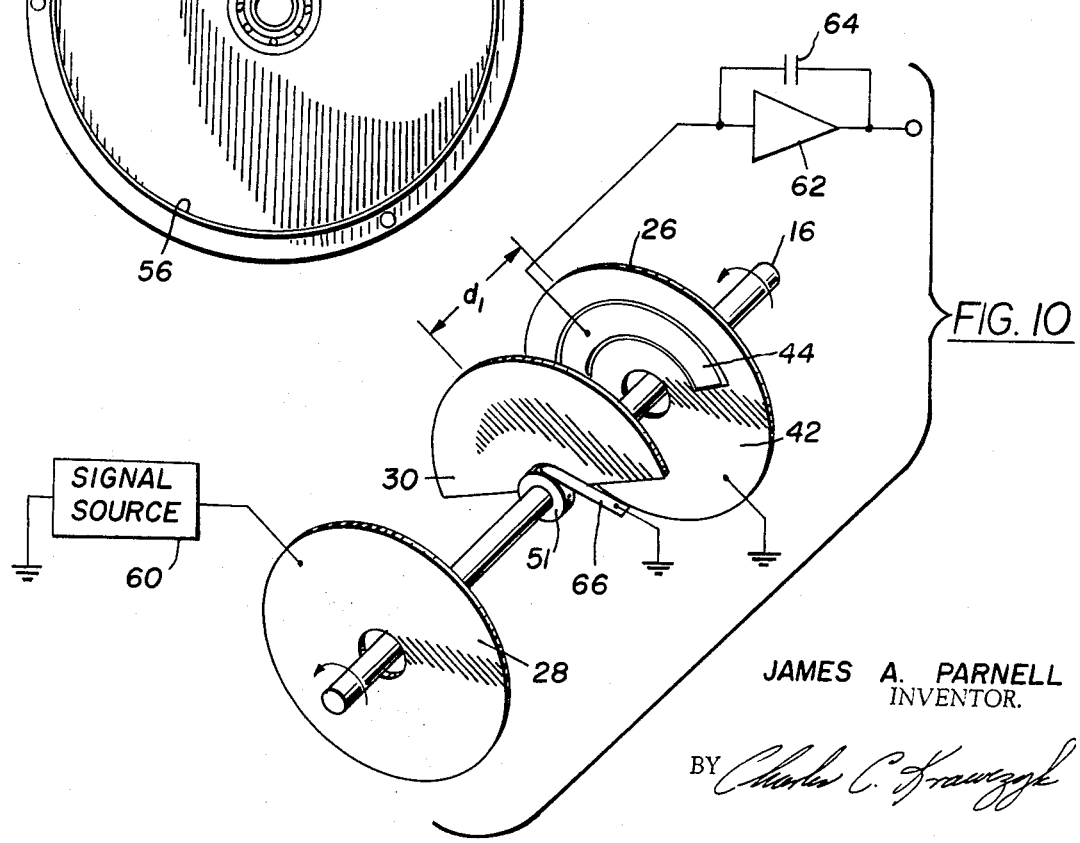
FIG. 10 is a schematic diagram of the capacitive transducer of the invention including a first embodiment of the electrical connections made thereto.

The capacitive transducer includes two stationary mounted parallel conductive plates 26 and 28 and a movable conductive plate 30 positioned in parallel relation between the other two plates, as best seen in FIGS. 2, 10 and 12. The movable plate 30 is mounted on the shaft 16 which in turn is rotatably mounted in the bearings 34 and 32 located in the front and back covers 14 and 12, respectively.

Figure 4:
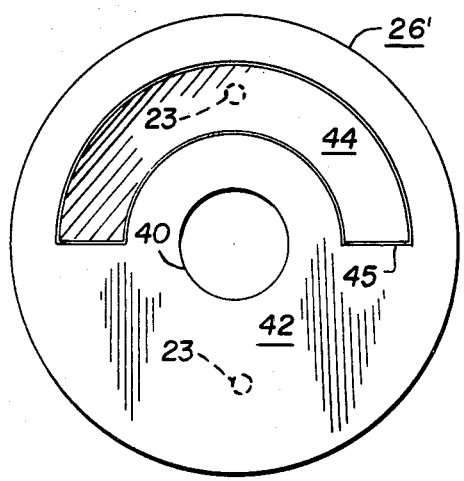
FIG. 4 is a first embodiment of an outer capacitive plate of the capacitive transducer of the invention including a single active portion.
Figure 5:
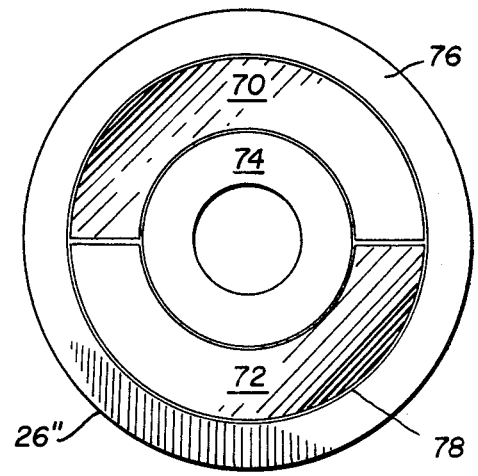
FIG. 5 is a second embodiment of an outer capacitive plate including two active portions.
Figure 6:
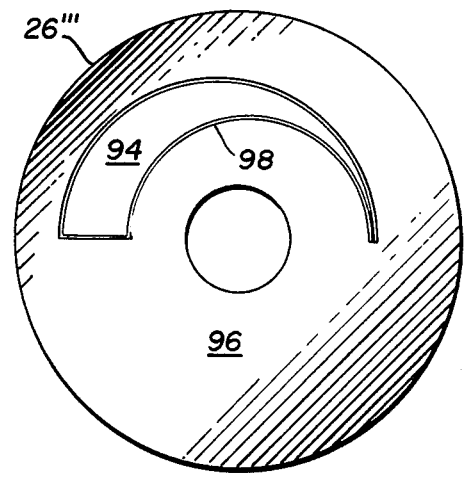
FIG. 6 is a third embodiment of an outer capacitive plate including a single non-linear active portion.

Three embodiments of the outer conductive plate 26 having varying shape are illustrated in FIGS. 4–6 as conductive plates 26', 26'' and 26''', respectively. The exemplary conductive plate 26, may for example, be formed on a circular disk made of an insulative plastic such as that used in printed circuit boards. The disk includes an opening 40 in the center to provide a clearance for the shaft 16. The conductive plate 26 comprises a thin copper film covering one side of the disk. In the embodiment of FIG. 4, the copper film of conductive plate 26' is divided into two areas, an active area 44 and a passive area 42, insulated from each other by a thin separation 45. The conductive plate 26 can be made by conventional printed board techniques. The active area 44 has an arcuate shape defined as the area between two coaxial semicircles of different diameters.

The conductive plate 26 fits within a recess 46 in the rear cover 12 with the active and passive areas facing the movable conductive plate 30, as best seen in FIG. 2. Connections to the active and passive areas of the conductive plate 26 are made by the wires 20 extending through the holes 22 in the cover 12 and the holes 23 in the plastic disk, with the wires soldered to the conductive coating.

Figure 3:
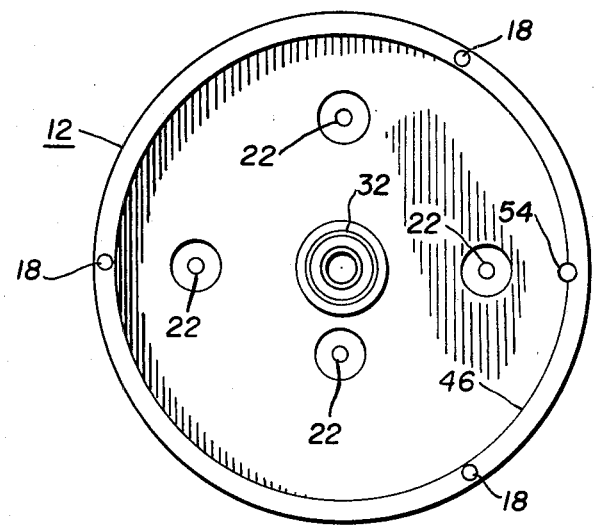
FIG. 3 is a plan view of the inner portion of the rear cover of the transducer housing of FIG. 1.
Figure 7:
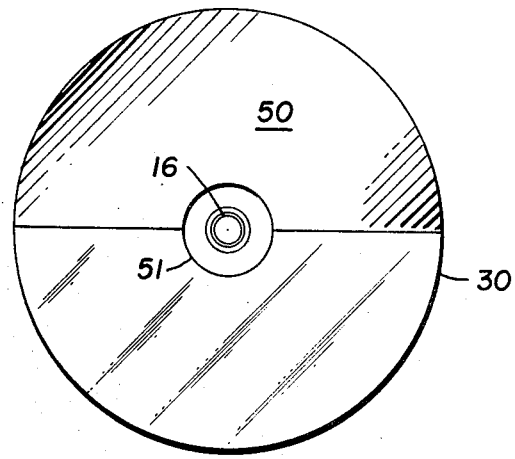
FIG. 7 is a plan view of a rotatable center conductive plate of a capacitive transducer according to the principles of the present invention.
Figure 8:
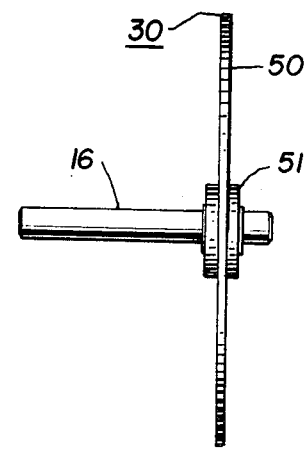
FIG. 8 is a side view of the embodiment of FIG. 7.
Figure 9:
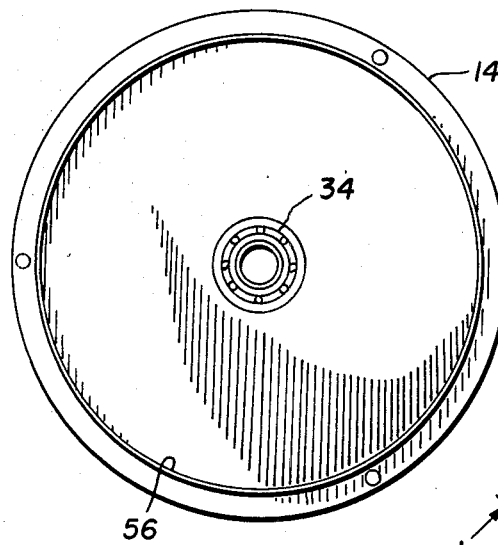
FIG. 9 is a plan view of the inner portion of the front cover of the transducer housing of FIG. 1.

The movable conductive plate 30 is also formed on a circular disk of insulative plastic. The conductive plate 30 comprises a thin copper metal coating 50 covering the top-half of the disk as viewed in FIG. 7. The conductive coating 50 is electrically connected with the shaft 16 through a metal bushing 51, as best seen in FIG. 3. The movable conductive plate 30 cooperatively rotates with the shaft 16 and is assembled in the housing so that the side with the metal coating 50 is facing towards the conductive plate 26, as shown in FIG. 2.

The second outer conductive plate 28 also is formed on a circular insulative plastic disk having the same general shape as the disk for the conductive plate 26 and comprises a single thin film of copper 52 covering the entire side facing the rotary conductive plate 30, as illustrated in FIG. 2. The conductive plate 28 is stationarily mounted in a recess 56, as shown in FIG. 2 in the front cover 14 and electrical connections thereto are made through the hole 54, as shown in FIG. 3 in the rear cover 12.

The operation of the capacitive transducer and the electrical connections thereto will be explained with reference to FIGS. 10–14. As previously mentioned, the capacitive transducer includes three conductive plates, the stationary or outer conductive plates 26 and 28 and the movable center conductive plate 30. The stationary plate 28 is coupled to a source of alternating signals 60. The passive area 42 of the stationary plate 26 is connected to ground while the active area 44 is connected to an amplifier 62 including a capacitor 64 connected in a negative feedback circuit. The movable plate 30 is connected to ground through the bushing 51 by a slip ring contact 66, as shown in FIG. 10. Since this capacitive transducer is primarily used with periodic signals, contact potentials between the bushing 51 and the slip ring 66 have no effect on the precision of the measurements. Also, the contact resistance does not have to be closely controlled, as the close capacitance provided by the sliding contact is sufficient to effectively ground the plate 30.

The plates 26, 28 and 30 are arranged in a manner so that the movable plate 30 acts as a variable shield between the other two. Since the net capacitance in a parallel plate capacitor is directly proportional to the surface areas of the plates, the capacitance between the exemplary plates 26' and 28 is proportional to the size of the plate 28 and the portion of the active area 44 not shielded by the movable plate 30. As the plate 30 is rotated over an angle of 180°, from an initial point entirely shielding the active area 44, to a point wherein the entire active area is exposed, the capacitance changes linearly from a minimum value approaching zero to a maximum value after approximately 180° of rotation.

If it is desirable to have a continuously rotatable capacitive transducer, the conductive plate 26 can be modified to, for example, the configuration of conductive plate 26'' as illustrated in FIG. 5, to include two active areas 70 and 72 each extending over an angle approaching 180° and each having an arcuate shape similar to that of the active area 44 of FIG. 4. The active areas 70 and 72 are insulated from each other and also are insulated from the passive areas 74 and 76 by a thin separation 78. The modified conductive plate 26'' can be connected to a switching circuit, as illustrated in FIG. 11, to provide a means for switching from one active area to the other for each 180° of rotation of the shaft 16. The passive areas 74 and 76 are grounded while the active areas 70 and 72 are connected to the separate contacts 80 and 82, respectively, of a switch 84. The movable contact 86 is connected to the input circuit of an amplifier 88 including a capacitor 90 connected in the negative feedback circuit. The switch 84 is mechanically coupled to a cam 92 which rotates with the shaft 16 to switch from one active area to the other for each 180° of rotation.

If a non-linear output signal versus shaft 16 rotation is desired, the conductive plate 26 can be modified, for example, in a manner as illustrated in FIG. 6 to form the conductive plate 26'''. The active area 94 has the form of a curved wedge and is insulated from the passive area 96 by a thin separation 98. As the shaft 16 is rotated a signal is developed by the amplifier circuit connected to the active area 94 that varies non-linearly in amplitude as a function of the rotation of the shaft 16.

It is highly desirable that the distance $d_1$ between the plates 26 and 30, as shown in FIG. 10, be small compared to the length or circumference of the active area on the exemplary plate 26'. This minimizes any curvature or fringing effect in the field between the plates 26 and 28. This fringing effect is otherwise noticeable at the ends of the range of the movable plate 30 in the case of the linear active area 44, or throughout the range of movement of the plate 30 in the case of the non-linear active area 94 of FIG. 6.

When the plates 26 and 30 are placed close together, the capacitance between the plate 30 and the active area 44 becomes quite large compared to the capacitance between the plates 26 and 28, especially when the plate 30 covers the entire active area 44. In effect, a capacitive divider is formed as illustrated within the dashed lines of FIG. 13. The variable capacitor $C_1$ corresponds to the capacitance between the plates 26 and 28 and the variable capacitor $C_2$ corresponds to the capacitance between the plate 30 and the active area 44, wherein the size of the capacitors $C_1$ and $C_2$ vary inversely with respect to each other as the shaft 16 is rotated. In order to have an accurate indication of the capacitance between the plate 28 and the active area 44 as a function of the rotation of the shaft 16, the effect of the capacitance $C_2$ must be eliminated or minimized to a point wherein it is negligible.

The effect of the capacitor $C_2$ is minimized in the capacitive transducer of the invention by maintaining the plate 30 and the active area 44 at substantially the same signal potential. This is accomplished, as illustrated in FIG. 10, by connecting the active area 44 to an input circuit of the high gain amplifier 62 including a negative feedback circuit comprising a capacitor 64 so that the input circuit is maintained at "virtual ground", i.e. substantially zero signal level. Capacitor 64 is illustrated as capacitor $C_3$ in FIG. 13. Since the movable plate 30 is grounded and the active area 44 is maintained at virtual ground, there is practically no A.C. or signal field between the two plates.

The effective input impedance of the amplifier connected to the active area 44 looks like a capacitor $C_{eff}$ wherein:

$$C_{eff} = C_3 A_v \quad (1)$$

and $A_v$ is the open loop gain of the amplifier. It has been found that the value of $C_{eff}$ can be made at least three orders of magnitude greater than the maximum value of $C_2$, which occurs with the active area 44 completely shielded by the plate 30.

Accordingly, errors due to $C_2$ are less than 0.1 percent, and the output from the amplifier (Vo) can be approximated to be:

$$V_o = V_s C_1 / C_3 \quad (2)$$

where $V_s$ is the input signal amplitude applied to the plate 28.

If extremely small spacing ($d_1$) is provided between the active area 44 and the plate 30, it may be desirable to utilize a "bootstrapping" technique, as illustrated in FIG. 12, to insure sufficient linearity. In this case the bushing 51 is electrically connected to the plate 30 but insulated from the shaft 16. As in FIG. 10, the active area 44 is connected to the amplifier 62 and the input signals from the source 60 are applied to the plate 28. The active area 44 in FIG. 12 is also connected to an input circuit of a unity gain amplifier 100. The output circuit of the amplifier 100 is connected to the slip ring contact 66. The unity gain amplifier 100 assures that there will be effectively no potential difference between the movable plate 30 and the active area 44, thus effectively cancelling the effect of the capacitor $C_2$. An equivalent circuit diagram of this capacitive transducer is illustrated in FIG. 14 where the capacitor 64 is schematically illustrated as capacitor $C_3$. By effectively maintaining the same signal on both plates of the capacitor $C_2$ any signal field therebetween is minimized.

It should be noted in the embodiments of the transducer of FIGS. 10–12, since the plate 30 and the active area 44 are maintained at substantially the same signal level and the capacitance therebetween is accordingly effectively eliminated, small movements of the plate 30 towards or away from the exemplary plates 26' and 28 produces no undesirable effects. As a result, only separation between the fixed plates 26 and 28 must be carefully controlled. In addition, the plate 30 may have a fair degree of freedom in its movement towards or away from the plates 26' and 28. Any force transversely directed with respect to the axis of the shaft 16 tending to change the parallel position of the plate 30 will produce little or no error. In contrast, the non-contacting transducers of the prior art require a very accurate control of the movable element with respect to the stationary elements and hence are sensitive to forces transverse to the usual direction of movement.

Although the present disclosure has been primarily directed to a system wherein the outer conductive plates of the transducer have been maintained stationary and the inner conductive plate moved, it is to be understood that the capacitive transducer will also function by maintaining the center plate 30 stationary and rotating the two outer plates 26 and 28 in unison. Alternatively the plates 28 and 30 can be held stationary and the plate 26 including the active area rotated with respect to the other two.

The output from the amplifiers of FIGS. 10–14 is an alternating voltage of the same form as that provided by the input signal source 60. In most cases the alternating voltage will be converted to a direct current signal. This can be accomplished by precision rectifying circuits using high gain direct current amplifiers with rectifiers in the feedback circuit. For maximum accuracy and lowest ripple the signal source should produce square wave signals. The use of this square wave signal simplifies the regulation of the amplitude of the input signal. The frequency stability of the signal source is not critical since the transfer function of the system is a ratio of capacitive reactances.

Although the capacitive transducer of the invention has been described by applying an input signal to the plate 28 and deriving an output signal from the active area 44, it is to be understood that the connections can be reversed. The input signal from the source 60 can also be applied to the active area 44 and the plate 28 connected to the input circuit of the amplifier 62. The result would be a variation in effective area of the driving plate rather than the area of the sensing plate connected to the input of the amplifier 62.

The capacitive transducer of the invention is a non-contacting transducer of infinite resolution, excellent linearity, repeatability and stability. The transducer can generate various non-linear input-to-output relationships. Furthermore, since the transducer does not have any critical sliding contacts, there is no wear problem and the friction loading is minimized. In addition to the foregoing, since the capacitive transducer requires three conductive plates which can for example be formed using printed circuit techniques and since the axial position of the movable element does not have to be critically maintained, the transducer of the invention can be relatively inexpensively built and still provide a high degree of linearity, stability, repeatability and infinite resolution as required.

What is claimed is:

1. An apparatus for converting a displacement to an electrical signal, comprising:
    a first conductive element for connection to a source of input electrical signals;
    a second conductive element disposed in close proximity to the first conductive element;
    a third conductive element disposed between the first and second conductive elements to function as a capacitance shield between the first and second conductive elements;
    first means for maintaining the second and third conductive elements at substantially the same signal potential;
    second means for providing relative movement between the second and third conductive elements in response to the displacement to be converted to an electrical signal so that the third conductive element functions as a shield to vary the capacitance between the first and second conductive elements; and
    circuit means coupled to the second element for developing an electrical signal at an output as a function of the relative movement between the second and third conductive elements in response to the displacement.

2. An apparatus for converting a displacement to an electrical signal, comprising:
    a first conductive element for connection to a source of input electrical signals;
    a second conductive element disposed in close proximity to the first conductive element;
    a third conductive element disposed between the first and second conductive elements to function as a capacitance shield between said first and second conductive elements;
    first means for maintaining the third conductive element at a substantially lower signal level than the level of the input electrical signals;
    second means for providing relative movement between said third conductive element and at least one of said first and second conductive elements in response to the displacement to be converted to an electrical signal so that said third conductive element functions as a shield to vary the capacitance between said first and second conductive elements; and circuit means coupled to the second conductive element for developing an electrical signal as a function of such relative movement in response to the displacement, and including means for maintaining the signal level on the second conductive element at substantially the signal level of said third conductive element.

3. The apparatus for converting the displacement to the electrical signal, as defined in claim 2, wherein the first means for maintaining the third conductive element at a substantially lower signal level than the level of the input electrical signals comprises means providing a reference of zero signal level electrically coupled to the third conductive element.

4. The apparatus for converting the displacement to the electrical signal, as defined in claim 2, wherein the circuit means coupled to the second conductive element develops an electrical signal having an amplitude varying as a function of the relative movement of the third conductive element.

5. The apparatus for converting the displacement to the electrical signal, as defined in claim 2, wherein the circuit means includes an amplifier having a capacitive element in a negative feedback circuit, the second conductive element being coupled to the input of the amplifier circuit so that the second conductive element is maintained at substantially the signal level of said third conductive element.

6. The apparatus as defined in claim 2, wherein said first conductive element is connected to a source of input electrical signals which provides regulated input signals of a substantially square wave form.

7. The apparatus as defined in claim 2, wherein one of said first and second conductive elements has a width which varies as a function of relative movement.

8. The apparatus as defined in claim 2, wherein said first means comprises an amplifier coupled between the second conductive element and the third conductive element.

9. Apparatus as defined in claim 8, wherein said first means includes a unity gain amplifier having its input circuit connected to said second conductive element and its output circuit connected to said third conductive element.

10. The apparatus for converting the displacement to the electrical signal, as defined in claim 2, wherein the first, second and third conductive elements are disposed substantially parallel to each other, and are substantially flat plates.

11. The apparatus as defined in claim 10, wherein said means for maintaining the signal level of the second conductive element at substantially the signal level of said third conductive element comprises means for providing an effective capacitance in shunt with the capacitance between the second and third conductive elements, the effective capacitance being sufficiently larger than the capacitance between the second and third conductive elements so that the second conductive element is maintained at substantially the signal level of said third conductive element.

12. The apparatus as defined in claim 10, wherein: one of said first and second conductive elements, comprises the shape of a circular disc, the other of said first and second conductive elements, comprises a shape defined by the area between two radial arcs, said third conductive element comprising a substantially circular sector, said first and second conductive elements are stationarily mounted about a line passing substantially through the center of said circular disc, the center of said radial arcs, and the center of said third conductive element, and said means for providing said relative movement includes means for rotating said third conductive element in substantially parallel relation with said first and second conductive elements about said line.

* * * * *